(12) United States Patent
Karasaridis et al.

(10) Patent No.: US 11,336,696 B2
(45) Date of Patent: May 17, 2022

(54) CONTROL ACCESS TO DOMAINS, SERVERS, AND CONTENT

(71) Applicant: AT&T Intellectual Property I, L.P., Atlanta, GA (US)

(72) Inventors: Anestis Karasaridis, Oceanport, NJ (US); Stephen Chou, Bridgewater, NJ (US); Aleksandr Zelezniak, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 162 days.

(21) Appl. No.: 16/803,487

(22) Filed: Feb. 27, 2020

(65) Prior Publication Data

US 2021/0273977 A1 Sep. 2, 2021

(51) Int. Cl.
*H04L 29/06* (2006.01)

(52) U.S. Cl.
CPC .......... *H04L 63/20* (2013.01); *H04L 63/0263* (2013.01); *H04L 63/0876* (2013.01)

(58) Field of Classification Search
CPC .. H04L 63/20; H04L 63/0876; H04L 63/0263
USPC .......................................................... 726/1
See application file for complete search history.

(56) References Cited

U.S. PATENT DOCUMENTS

| | | | | |
|---|---|---|---|---|
| 2008/0109871 A1* | 5/2008 | Jacobs | ............. | H04L 63/20 726/1 |
| 2010/0107215 A1* | 4/2010 | Bechtel | ............. | H04L 63/105 726/1 |
| 2010/0217853 A1* | 8/2010 | Alexander | ............. | H04L 63/20 709/223 |
| 2010/0325710 A1* | 12/2010 | Etchegoyen | ............. | G06F 21/73 726/7 |
| 2016/0065472 A1* | 3/2016 | Gleixner | ............. | H04W 76/10 370/254 |
| 2018/0255102 A1* | 9/2018 | Ward | ............. | H04L 63/10 |

\* cited by examiner

*Primary Examiner* — Kambiz Zand
*Assistant Examiner* — Aubrey H Wyszynski
(74) *Attorney, Agent, or Firm* — Guntin & Gust, PLC; Kenneth Kwan

(57) ABSTRACT

A system to control access to domains, servers, or content, among other things. There may be individualized or global policies. Policy servers or other devices may interface with databases, DNS servers, firewalls, programmable virtualized routers, or dynamic host configuration protocol servers, among other devices to dynamically update various policy enforcement elements.

20 Claims, 4 Drawing Sheets

US 11,336,696 B2

CONTROL ACCESS TO DOMAINS, SERVERS, AND CONTENT

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. The operation and management of a networks is highly susceptible to anomalies, attacks, and faults.

This background information is provided to reveal information believed by the applicant to be of possible relevance. No admission is necessarily intended, nor should be construed, that any of the preceding information constitutes prior art.

SUMMARY

Today, secure access to the cloud may be critical to protect against malicious sites, servers, or content. Conventionally, access is constrained based on enterprise wide policies or by location or by department to limit exposure to certain content, established for the benefit of an enterprise. The disclosed control access system provides ways to manage access networks at the domain, network, and application layers at a granular level (e.g., at the device or user level) without the need of specialized software clients implemented fully in an access device (e.g., user equipment (UE) or UCPE). A plurality of policies may be distributed to a plurality of devices at approximately the same time (e.g., within seconds) and may allow for efficient management of firewalls, switches, routers, or other devices.

In an example, an apparatus may include a processor and a memory coupled with the processor that effectuates operations. The operations may include receiving, by a virtual network function associated with the apparatus, a policy of a plurality of policies, the plurality of policies comprising information associated with accessing a respective plurality of devices in a network; receiving access information for accessing a first device of the plurality of devices in the network, wherein the access information is stored in association with a domain name on a second device remote from the virtual network function; receiving, by the virtual network function, a request to access the first device; determining, by the virtual network function, to restrict access to the first device according to the policy; updating, by the virtual network function, the policy to include at least a portion of the access information to restrict the access to the first device; and sending, by the virtual network function, the updated policy to at least one of the first device or another device in the network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Conventionally, to control both domain and internet protocol (IP) access, many solutions require software to be installed on all client devices (e.g., end user devices). The client software may create a tunnel to third party sites that blocks direct access to the destination IP address. Alternatively, a firewall rule may be manually configured to apply the control. In addition, in order to identify a user as authenticated, conventionally there may be a requirement of continuous monitoring of an active directory server. In conventional systems, to apply new DNS policies, the existing DNS servers need to be re-provisioned with new global policy files or client devices need to be pointed to new DNS servers that can apply the domain policies. Re-pointing to new DNS servers configuration requires client reconfiguration or dynamic host configuration protocol (DHCP) reconfiguration which may be a significant undertaking for large networks.

Disclosed herein is a system to control access to domains, servers, or content, among other things. There may be individualized (e.g., per device) or global (e.g., per network) policies. Policy servers or other devices may interface with databases, DNS servers, firewalls (e.g., application or network firewalls), programmable virtualized routers (vRouters), or DHCP servers, among other devices (physical or virtual) to dynamically update various policy enforcement elements.

Figure 1:
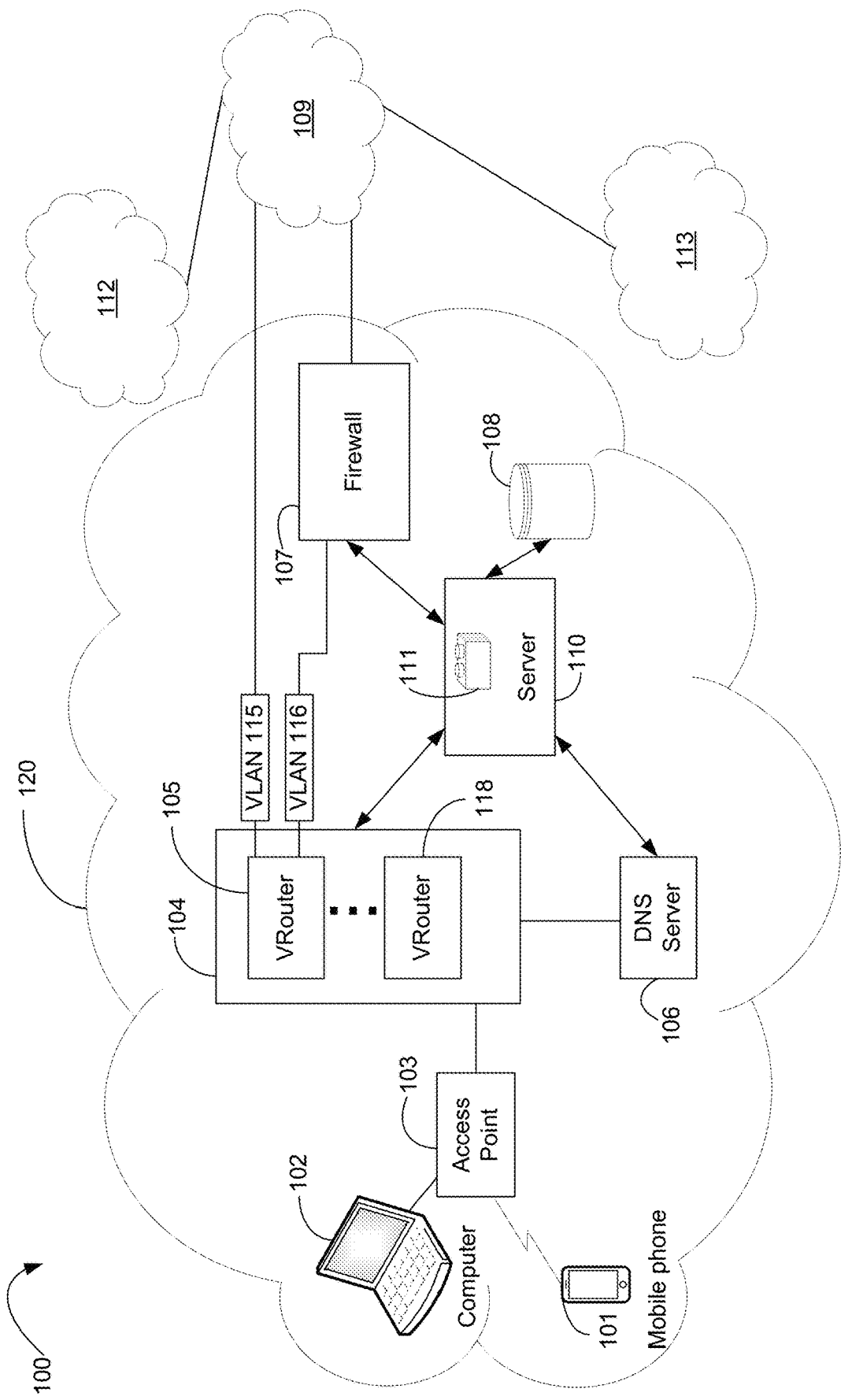
FIG. 1 illustrates an exemplary system to dynamically manage network access for multiple devices.

FIG. 1 illustrates an exemplary system to dynamically control access to domains, servers, or content, among other things. System 100 may include multiple networks, such as network 120, network 112, or network 113. Network 120 may include mobile device 101, device 102, access point 103, device 104, vRouter 105, domain name service (DNS) server 106, server 110, firewall (FW) 107, or database 108. The devices of system 100 may be communicatively connected with each other and network 109 (e.g., a cloud network). Network 112 or network 113 may be local networks that may include their own vRouters, access points, DNS servers, firewalls, or the like, as shown in network 120.

With continued reference to FIG. 1, mobile device 101 may include a laptop, tablet, autonomous vehicle (e.g., SAE Intl level 3 to level 5 automation), or mobile phone, among other things. Device 102 or device 104 may include wireless or wired devices, such as servers, routers, switches, desktop computers, or the like. Server 110, as shown, may include a policy data package 111, which may be a plugin, file, message, or the like that may assist in control access to domains, servers, or content using network functions. In an example, the information of server 110 (e.g., policy data package 111) may include domains, IP addresses, protocols, data flows, content, or the like that may be used to filter or redirect data packets. Server 110 may obtain (e.g., receive) information from multiple sources to assist in delivering control access to domains, servers, or content. The information of server 110 may include information from firewall 107, database 108, DNS server 106, device 104, vRouter 105, or the like.

Figure 2:
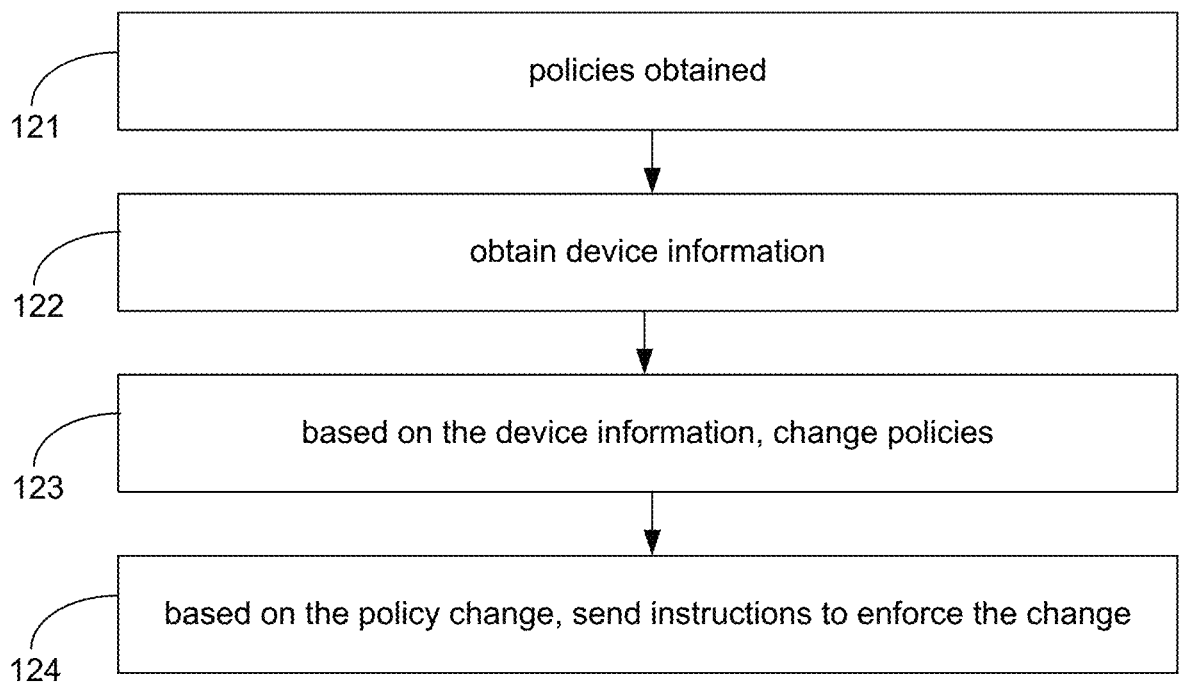
FIG. 2 illustrates an exemplary method to dynamically manage network access for multiple devices.

FIG. 2 illustrates an exemplary method to dynamically control access to domains, servers, or content. At step 121, policies may be obtained. The policies may be obtained by server 110 from database 108, firewall 107, vRouter 105, or DNS server 106 of network 120 or another network (e.g., network 112 or network 113). In an example, database 108 may include policies that were predetermined by a user. In another example, access point 103 may indicate to server 110 that mobile device 101 has attached to network 120. Mobile device 101 may indicate during its attachment procedure that it was attached to network 112 or server 110 may query a core network device for previous locations of mobile device 101. Based on this attachment, server 110 may query network 112 for policies associated with mobile device 101, in which mobile device 101 was previously connected with network 112.

With continued reference to step 121 of FIG. 1, in yet another example, server 110 may download an updated blacklist, whitelist, or the like based on the attachment of mobile device 101 or some other factor (e.g., time, threshold number of devices added to the network, etc.). Mobile device 101 may be known for having security issues (or associated with a user that has had security issues) and may be marked suspicious. Because of the suspicious marking, a high percentage (e.g., 60%) of network traffic from or to mobile device 101 may go through stricter screening. For example, stricter screening may include data packets to or from mobile device 101 may be redirected through the firewall and policies may be enforced in multiple devices, such as DNS server 106, vRouter 105, and firewall 107.

Table 1 shows example policies. The policy to be applied for a given flow may be determined for mobile device 101 (or other devices) based on the global policy overlaid by the policies defined for the group the device belongs to (or a single member group which includes only itself). The policies may include whitelists, blacklists, or redirect lists. Depending on the trigger or the action, the enforcement point may vary. For example, if the trigger is a domain in which the action is to block the domain, then the action may be enforced by DNS server 106. However, if the action is to redirect to the firewall (REDIRECT_FW) then the enforcement may involve DNS server 106 to identify the target IP address and the vRouter to forward traffic to the firewall.

TABLE 1

| Network 120 | | | | |
|---|---|---|---|---|
| Trigger | Category | Action | Enforced In | Parameters |
| www.malware.com | Known bad | Block | DNS | Null |
| 10.10.10.10 (IPv4 or v6) | Known good | Allow | vRouter | |
| Ae121fef (signature) | Suspicious | Redirect_FW | FW and vRouter | VLAN 116 |
| www.xyx.com | Suspicious | Redirect_FW | DNS, vRouter, and FW | VLAN 116 |
| www.abcc.com | Suspicious | Redirect_DNS | DNS | 135.20.20.100 |

At step 122, obtain device information with regard to devices of system 100. The device information may be obtained by server 110 from database 108, firewall 107, vRouter 105, or DNS server 106. The device information may be associated with communications between devices of system 100 or other devices that are connected to network 109. In an example, the information may include historical device operation (e.g., memory usage, CPU usage, errors, number of a type of request, bandwidth usage, or identified malware) associated with vRouter 105, DNS server 106, mobile device 101, or firewall 107, among other apparatuses. Server 110 (or the other devices of system 100) may analyze the device information of step 122 (also referred to as information), which may reveal connections (e.g., correlations) between usage and errors, or the like.

At step 123, based on the information of step 122, the policies of step 121 may be changed in order to add new polices (e.g., new trigger), remove policies, relocate policies (e.g., from a first vRouter to a second vRouter or DNS server), or update existing polices. Example policy changes may include updating rules to DNS server 106 if policy is enforced in DNS; updating access control lists (ACLs) on device 104 if policy is enforced on network layer (e.g. IP address, VLAN); or updating firewall rules if policy is enforced on application layer (e.g. content signature).

The policies may be based on analysis of historical information (e.g., data flows or errors) associated with vRouter 105, DNS server 106, mobile device 101, or firewall 107, among other devices. In an example, based on the information of step 122, there may be a determination that Ae121fef, which may be associated with a hash of content from mobile device 101, is suspicious. In addition to the Ae121fef data being sent to the firewall, mobile device 101 may be redirected to a walled garden or an informational page that provides helpful information about applications associated with the Ae121fef data.

TABLE 2

Network 120 (Updated Table 1)

| Trigger | Category | Action | Enforced In | Parameters |
|---|---|---|---|---|
| www.malware.com | Known bad | Block | DNS | Null |
| 10.10.10.10 | Known good | Allow | vRouter | VLAN 116 |
| Ae121fef (signature) | Suspicious | Redirect_FW; *Send mobile device 101 to informational page* | FW and vRouter | VLAN 116 |
| www.xyx.com | Suspicious | Redirect_FW | DNS, vRouter 105, and FW | VLAN 116 |
| *www.yzy.com* | *Known good* | *Allow* | *DNS, vRouter 118* | *VLAN 115* |
| www.abcc.com | Suspicious | Redirect_DNS | DNS | 135.20.20.100 |

With continued reference to FIG. 2, at step 124, based on the change of step 123, send instructions to one or more devices that may enforce the change. In an example, server 110 may send different policies to firewall 107, database 108, DNS server 106, device 104, access point 103, or vRouter 105. In this instance, vRouter 105, in view of Table 2, may just have three policies and only the updated Ae121fef, may be sent to vRouter 105. Only sending the updated policy may help minimize the use of network resources. As shown in system 100 more generally, vRouter 105 may direct data traffic from mobile device 101 or device 102 directly to network 109, to firewall 107, to DNS server 106, or the like. With regard to database 108, it may obtain the policies regardless and then subsequently send it to other similar databases in other networks (e.g., network 112 or network 113). The other networks may use the historical data (e.g., device information or policies) to help determine whether to include a similar policy that marks certain traffic suspicious or the like and enforces the policy.

With continued reference to FIG. 2, it is contemplated herein that policies may be shared from device type to device type (e.g., DNS server to DNS server) but executed differently based on factors that may be particular to the local network. Server 110, for example, may determine an optimal apparatus in the network to implement the www-.malware.com policy of Table 2 within network 120 to be DNS server 106. Within this same example, a server of network 113, for example, may determine an optimal apparatus in the network to enforce the www.malware.com policy within network 113 (a different network than network 120 previously provided) to be vRouter 105. An access control list may block all DNS query messages of www-.malware.com at vRouter 105. Factors that may determine which device in the network may enforce the policy may include memory usage, CPU usage, errors, number of a type of request, bandwidth usage, or the like. In this example, a threshold CPU usage may be met for DNS server 106 (e.g., low CPU usage availability), therefore vRouter 105 may be used to enforce the policy instead of DNS server 106.

Figure 3:
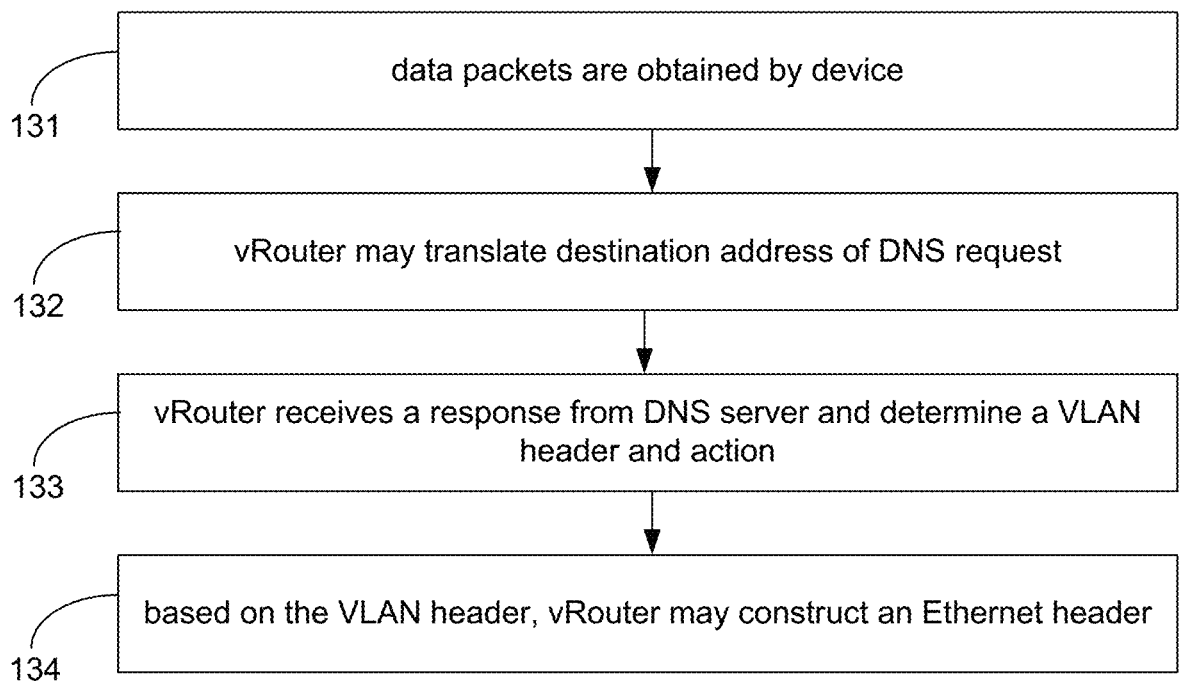
FIG. 3 illustrates an exemplary method to dynamically manage network access for multiple devices.

FIG. 3 illustrates an exemplary method to dynamically control access to domains, servers, or content. Below is an example method that executes a domain name based trigger. At step 131, data packets are obtained by device 104 that may be for a data flow associated with a domain. The obtained packets may be passed on to vRouter 105 based on an identifier (e.g., MAC, IP address, or domain) or other factors. At step 132, vRouter 105 may translate destination address of DNS request to DNS server 106. DNS server 106 may be a DNS proxy that forwards requests to downstream DNS servers (e.g., Authoritative DNS). DNS server 106 may update match/action table (e.g., Table 2) with IP address from an A record.

With continued reference to FIG. 3, at step 133, vRouter 105 may receive a response from DNS server 106 and based on the received IP address in the response (e.g., matching the IP address to an ACL), vRouter 105 may determine a VLAN header and action, among other things (e.g., Table 2) for the data flow through vRouter 105. At step 134, based on the VLAN header, vRouter 105 may construct an Ethernet header and forward the data flow to the appropriate VLAN (e.g., VLAN 115 or VLAN 116 of FIG. 1), based on Table 2. It is contemplated herein that other encapsulations may be used, such as VXLAN, SRv6, or the like.

It is contemplated that the steps disclosed herein (e.g., FIG. 2 and FIG. 3) may be distributed over a plurality of devices or executed on just one device (physical or virtual).

The disclosed control access system may be a dynamic and scalable system that provides for network security and the control access system may allow for the use of software defined access devices (e.g., whitebox devices) for secure access with over-the top solutions that can scale. The disclosed subject matter may allow for the following: a) minimizing the need to develop, install, or configure a special software client on each end-user device; b) minimizing the need to reconfigure client devices (e.g., reconfigure operating systems) or applications to use a new DNS server; c) allowing selection of a set of global policies and apply exceptions for blocking, whitelisting, or redirecting to apply policies; d) restricting access in multiple protocol layers (e.g., network, session, or application layers) for increased scalability; or e) allowing traffic to bypass certain devices.

Policies may be dynamically distributed to network devices and may be distributed differently based on the network design. Policies may be sent to a database through external feeds or through web portal entries. DNS server 106 or other devices of system 100 may be refreshed whenever there is a change in the database to enforce policies related to domain names. Database plugin can directly update vRouter network firewall for network layer policies (e.g. if the policy is to block an IPv4 or IPv6 target server) or an application firewall for application layer policies or the vRouter to apply firewall redirects. The disclosed subject matter allows for a programmable vRouter with destination network address translation (DNAT), VLAN, or VxLAN capability.

Figure 4:
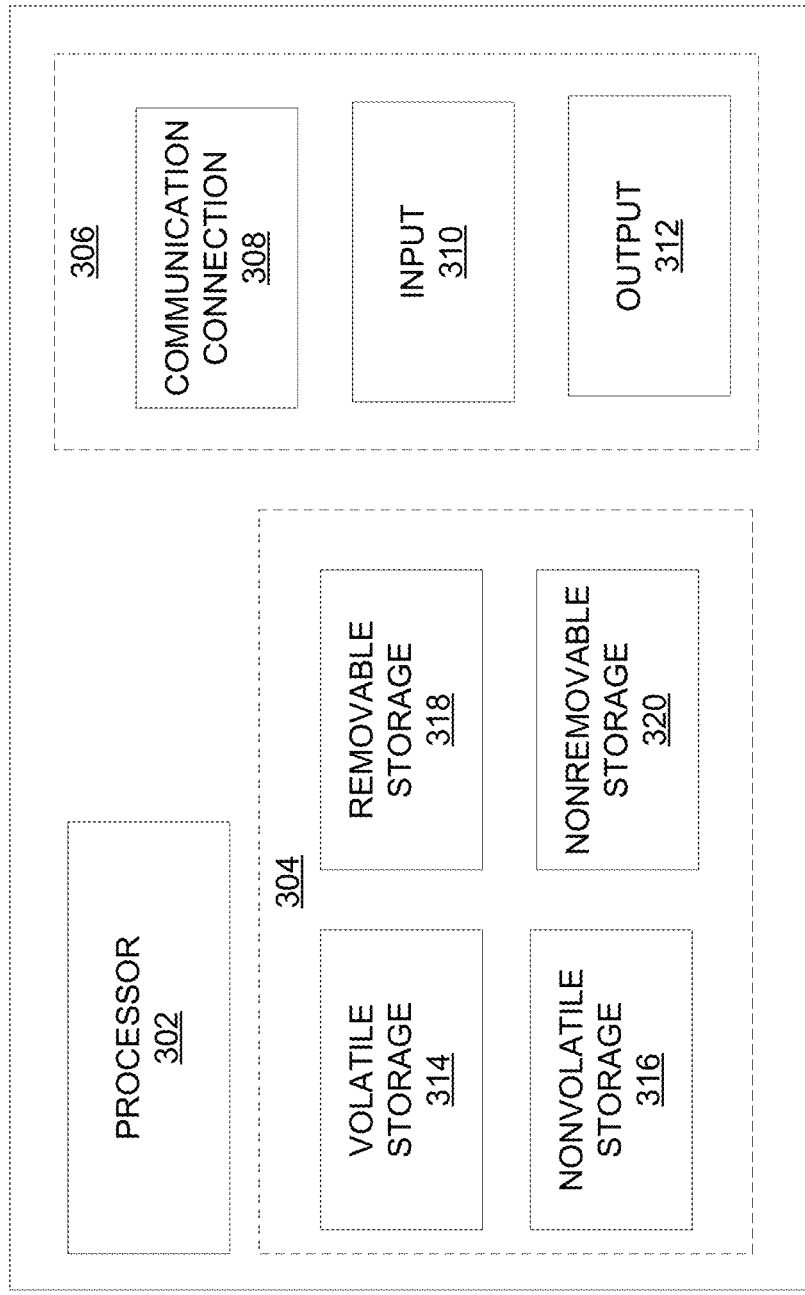
FIG. 4 illustrates a schematic of an exemplary network device.

FIG. 4 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
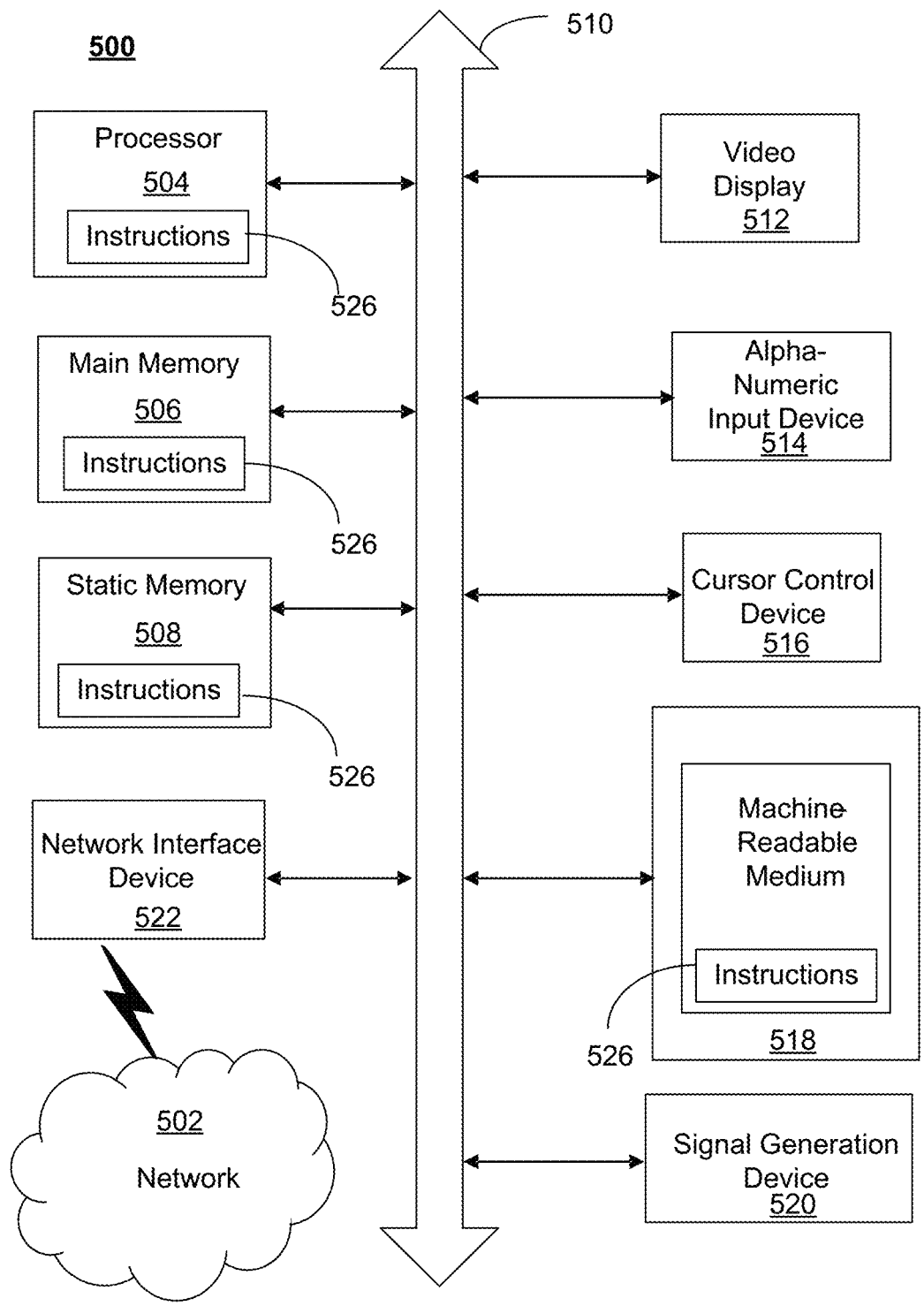
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, DNS server 106, access point 103, device 104, mobile device 101, device 102, server 111, firewall 107, and other devices of FIG. 1. In some examples, the machine may be connected to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which messages for controlling access can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—controlling access—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for managing or controlling access to devices, domains, or network identifiers. A method, system, computer readable storage medium, or apparatus may provide for obtaining (e.g., receiving) a first policy of a plurality of policies by a server, the plurality of policies associated with a plurality of devices in a first network, the plurality of devices comprises a second firewall, domain name service (DNS) server, switch, or router; obtaining device information, the device information describing data associated with the plurality of devices in the first network; based on the device information, determining an update to the first policy of the plurality of policies; and sending, to a first device and a second device of the plurality of devices, the update of the first policy of the plurality of policies. The first device and second device may be different types of devices (e.g., firewall vs. router) and may affect at least one different layer or security operation than the other device. For example, the first device may operate on the application layer while the second device does not or the first device operates on domain restriction (e.g., domain names) while the second device does not. The first policy may be associated with a domain name, a network identifier, protocol, application type, or data packet content, among other things. Based on a previous location of a mobile device, the first policy may be obtained from a second network, wherein the mobile device is currently connected to the first network. The update to the first policy may include redirecting data traffic from the first firewall through a second firewall, wherein the first firewall or second firewall may be virtual. The update to the first policy of the plurality of policies may be sent to the plurality of devices at approximately the same time (e.g., within seconds). The device information may include usage rate of a central processing unit of the first device, usage rate of a memory of the first device, usage of bandwidth of the first device. The apparatus or the other devices may be virtualized. All combinations in this paragraph and the below paragraph (including the removal or addition of steps) are contemplated in a manner that is consistent with the other portions of the detailed description.

A method, system, computer readable storage medium, or apparatus may provide for receiving, by a virtual network function associated with the apparatus, a policy of a plurality of policies, the plurality of policies comprising information associated with accessing a respective plurality of devices in a network; receiving access information for accessing a first device of the plurality of devices in the network, wherein the access information is stored in association with a domain name on a second device remote from the virtual network function; receiving, by the virtual network function, a request to access the first device; determining, by the virtual network function, to restrict access to the first device according to the policy; updating, by the virtual network function, the policy to include at least a portion of the access information to restrict the access to the first device; and sending, by the virtual network function, the updated policy to at least one of the first device or another device in the network. The at least a portion of the access information comprises one or more IP addresses corresponding to the domain name. The method, system, or apparatus may provide for determining, by the virtual network function, to redirect access to a third device according to a second policy of the plurality of policies; updating, by the virtual network function, the second policy to include information associated with redirecting the access to the third device; and sending, by the virtual network function, the updated second policy to an intermediary device for routing to a firewall device, wherein the updated second policy configures the firewall device to restrict access to the third device. All combinations in this paragraph (including the removal or addition of steps) are contemplated in a manner that is consistent with the other portions of the detailed description.

What is claimed:

1. An apparatus comprising:
   a processor; and
   a memory coupled with the processor, the memory storing executable instructions that when executed by the processor cause the processor to effectuate operations comprising:
      receiving, by a virtual network function associated with the apparatus, a policy of a plurality of policies, the plurality of policies comprising information associated with accessing a respective plurality of devices in a network;
      receiving access information for accessing a first device of the plurality of devices in the network, wherein the access information is stored in association with a domain name on a second device remote from the virtual network function;
      receiving, by the virtual network function, a request to access the first device;
      determining, by the virtual network function, to restrict access to the first device according to the policy;
      updating, by the virtual network function, the policy to include at least a portion of the access information to restrict the access to the first device, resulting in an updated policy; and
      causing, by the virtual network function, the updated policy to be transmitted to a second network different from the network, wherein the virtual network function comprises a virtual router, and wherein the updated policy is implemented in the second network by a domain name service (DNS) server.

2. The apparatus of claim 1, wherein the at least a portion of the access information comprises one or more internet protocol addresses corresponding to the domain name, wherein the virtual router is selected to implement the updated policy in the network based on thresholds relating to processing or memory resources being satisfied, and wherein the DNS server is selected to implement the updated policy in the second network based on thresholds relating to processing or memory resources not being satisfied.

3. The apparatus of claim 1, the operations further comprising:
   determining, by the virtual network function, to redirect access to a third device according to a second policy of the plurality of policies;
   updating, by the virtual network function, the second policy to include information associated with redirecting the access to the third device, resulting in an updated second policy; and
   sending, by the virtual network function, the updated second policy to an intermediary device for routing to a firewall device, wherein the updated second policy configures the firewall device to restrict access to the third device.

4. The apparatus of claim 1, wherein, based on a previous location of a mobile device, the policy was received from a different network, wherein the mobile device is currently connected to the network.

5. The apparatus of claim 1, wherein the updated policy is sent to the plurality of devices at approximately the same time, wherein the plurality of devices comprises a firewall or a DNS server.

6. The apparatus of claim 1, wherein the updated policy is associated with a restriction of the domain name, a network identifier, a protocol, or a data packet content.

7. The apparatus of claim 1, wherein the plurality of devices comprises a switch or a router.

8. A method comprising:
- receiving, by a virtual network function, a policy of a plurality of policies, the plurality of policies comprising information associated with accessing a respective plurality of devices in a network;
- receiving access information for accessing a first device of the plurality of devices in the network, wherein the access information is stored in association with a domain name on a second device remote from the virtual network function;
- receiving, by the virtual network function, a request to access the first device;
- determining, by the virtual network function, to restrict access to the first device according to the policy;
- updating, by the virtual network function, the policy to include at least a portion of the access information to restrict the access to the first device, resulting in an updated policy; and
- sending, by the virtual network function, the updated policy to a second network external to the network, wherein the virtual network function comprises a virtual router, and wherein the updated policy is implemented in the second network by a domain name service (DNS) server.

9. The method of claim 8, wherein the at least a portion of the access information comprises one or more internet protocol addresses corresponding to the domain name, wherein the virtual router is selected to implement the updated policy in the network based on thresholds relating to processing or memory resources being satisfied, and wherein the DNS server is selected to implement the updated policy in the second network based on thresholds relating to processing or memory resources not being satisfied.

10. The method of claim 8, further comprising:
- determining, by the virtual network function, to redirect access to a third device according to a second policy of the plurality of policies;
- updating, by the virtual network function, the second policy to include information associated with redirecting the access to the third device, resulting in an updated second policy; and
- sending, by the virtual network function, the updated second policy to an intermediary device for routing to a firewall device, wherein the updated second policy configures the firewall device to restrict access to the third device.

11. The method of claim 8, wherein, based on a previous location of a mobile device, the policy was received from a different network, wherein the mobile device is currently connected to the network.

12. The method of claim 8, wherein the updated policy is sent to the plurality of devices at approximately the same time, wherein the plurality of devices comprises a firewall or a DNS server.

13. The method of claim 8, wherein the updated policy is associated with a restriction of a network identifier, protocol, or data packet content.

14. The method of claim 8, wherein the plurality of devices comprises a switch or a router.

15. A computer readable storage medium storing computer executable instructions that when executed by a computing device cause said computing device to effectuate operations comprising:
- receiving, by a virtual network function, a policy of a plurality of policies, the plurality of policies comprising information associated with accessing a respective plurality of devices in a network;
- receiving access information for accessing a first device of the plurality of devices in the network, wherein the access information is stored in association with a domain name on a second device remote from the virtual network function;
- receiving, by the virtual network function, a request to access the first device;
- determining, by the virtual network function, to restrict access to the first device according to the policy;
- updating, by the virtual network function, the policy to include at least a portion of the access information to restrict the access to the first device, resulting in an updated policy; and
- sending, by the virtual network function, the updated policy to a second network, wherein the virtual network function comprises a virtual router, and wherein the updated policy is utilized in the second network by a domain name service (DNS) server.

16. The computer readable storage medium of claim 15, wherein the at least a portion of the access information comprises one or more internet protocol addresses corresponding to the domain name, wherein the virtual router is selected to implement the updated policy in the network based on thresholds relating to processing or memory resources being satisfied, and wherein the DNS server is selected to implement the updated policy in the second network based on thresholds relating to processing or memory resources not being satisfied.

17. The computer readable storage medium of claim 15, wherein the operations further comprise:
- determining, by the virtual network function, to redirect access to a third device according to a second policy of the plurality of policies;
- updating, by the virtual network function, the second policy to include information associated with redirecting the access to the third device, resulting in an updated second policy; and
- sending, by the virtual network function, the updated second policy to an intermediary device for routing to a firewall device, wherein the updated second policy configures the firewall device to restrict access to the third device.

18. The computer readable storage medium of claim 15, wherein, based on a previous location of a mobile device, the policy was received from a different network, wherein the mobile device is currently connected to the network.

19. The computer readable storage medium of claim 15, wherein the updated policy is sent to the plurality of devices at approximately the same time, wherein the plurality of devices comprises a firewall or a DNS server.

20. The computer readable storage medium of claim 15, wherein the updated policy is associated with a restriction of a protocol or a data packet content.

* * * * *